(12) United States Patent
Long

(10) Patent No.: US 11,226,426 B2
(45) Date of Patent: Jan. 18, 2022

(54) GEOPHYSICAL SURVEY SYSTEMS AND RELATED METHODS

(71) Applicant: PGS Geophysical AS, Oslo (NO)

(72) Inventor: Andrew Samuel Long, West Perth (AU)

(73) Assignee: PGS Geophysical AS, Oslo (NO)

( * ) Notice: Subject to any disclaimer, the term of this patent is extended or adjusted under 35 U.S.C. 154(b) by 303 days.

(21) Appl. No.: 16/260,384

(22) Filed: Jan. 29, 2019

(65) Prior Publication Data

US 2019/0154858 A1 May 23, 2019

Related U.S. Application Data

(62) Division of application No. 15/280,223, filed on Sep. 29, 2016, now Pat. No. 10,234,585.

(60) Provisional application No. 62/265,803, filed on Dec. 10, 2015.

(51) Int. Cl.
*G01V 1/38* (2006.01)

(52) U.S. Cl.
CPC .......... *G01V 1/3808* (2013.01); *G01V 1/3817* (2013.01); *G01V 1/3826* (2013.01); *G01V 1/3861* (2013.01)

(58) Field of Classification Search
CPC .. G01V 1/3808; G01V 1/3826; G01V 1/3861; G01V 1/3817
See application file for complete search history.

(56) References Cited

U.S. PATENT DOCUMENTS

| 3,491,848 | A | * | 1/1970 | Giles | G01V 1/006 367/17 |
| 5,142,498 | A | | 8/1992 | Duren | |
| 5,616,059 | A | * | 4/1997 | Solomon | B63B 22/18 114/253 |
| 5,913,280 | A | | 6/1999 | Nielsen et al. | |
| 5,995,452 | A | | 11/1999 | Bouyoucous | |
| 6,028,817 | A | | 2/2000 | Ambs | |
| 6,606,958 | B1 | | 8/2003 | Bouyoucos | |
| 6,942,059 | B2 | | 9/2005 | Smith | |
| 7,203,130 | B1 | | 4/2007 | Welker | |

(Continued)

FOREIGN PATENT DOCUMENTS

| AU | 2003207039 | 2/2004 |
| AU | 2004203132 | 2/2005 |

(Continued)

OTHER PUBLICATIONS

European Patent Office, Examination Report for EP Application No. 16809340.9, dated Feb. 8, 2021; 5 pages.

(Continued)

*Primary Examiner* — Ian J Lobo

(57) ABSTRACT

Geophysical survey methods. At least some of the example embodiments are methods of performing a marine geophysical survey including: towing a plurality of sensor streamers behind a tow vessel, each sensor streamer coupled to the tow vessel by a respective lead-in cable; towing, by the tow vessel, a plurality of lead vessels with each lead vessel pulling a respective seismic source, each lead vessel pulled by a respective tow cable and at least one intermediate cable; actuating the respective seismic sources pulled by the plurality of lead vessels; and gathering seismic data by each of the sensor streamers.

15 Claims, 10 Drawing Sheets

(56) References Cited

U.S. PATENT DOCUMENTS

| | | | |
|---|---|---|---|
| 7,376,045 B2 | 5/2008 | Falkenberg et al. | |
| 7,391,613 B2 | 6/2008 | Lai et al. | |
| 7,391,673 B2 | 6/2008 | Regone et al. | |
| 7,518,951 B2 | 4/2009 | Solheim et al. | |
| 7,701,803 B2 | 4/2010 | Welker | |
| 7,805,249 B2 | 9/2010 | Summerfield et al. | |
| 7,859,945 B2 | 12/2010 | Sallas et al. | |
| 7,881,158 B2 | 2/2011 | Tenghamn | |
| 7,974,152 B2 | 7/2011 | Tenghamn | |
| 8,094,514 B2 | 1/2012 | Tenghamn | |
| 8,102,731 B2 | 1/2012 | Cambois | |
| 8,335,127 B2 | 12/2012 | Tenghamn | |
| 8,427,901 B2 | 4/2013 | Lunde et al. | |
| 8,565,041 B2 | 10/2013 | Ruet | |
| 8,588,025 B2 | 11/2013 | Moldoveanu et al. | |
| 8,724,426 B2 | 5/2014 | Welker | |
| 8,730,760 B2 | 5/2014 | Cambois et al. | |
| 8,824,239 B2 | 9/2014 | Welker et al. | |
| 8,830,786 B1 | 9/2014 | Elvestad | |
| 8,976,622 B2 | 3/2015 | Hillesund et al. | |
| 8,976,623 B2 | 3/2015 | Sudow et al. | |
| 9,025,417 B2 | 5/2015 | Hopperstad et al. | |
| 9,103,943 B2 | 8/2015 | Cowlard et al. | |
| 9,134,442 B2 | 9/2015 | Dellinger et al. | |
| 9,151,859 B2 | 10/2015 | Martin | |
| 9,158,019 B2 | 10/2015 | Bagaini | |
| 9,207,349 B2 | 12/2015 | Cambois | |
| 9,213,119 B2 | 12/2015 | Eick et al. | |
| 9,217,806 B2 | 12/2015 | Peppe et al. | |
| 9,234,977 B2 | 1/2016 | Ferber et al. | |
| 9,250,345 B2 | 2/2016 | Mattsson | |
| 9,341,725 B2 | 5/2016 | Tenghamn | |
| 9,360,574 B2 | 6/2016 | Tenghamn et al. | |
| 9,377,550 B2 * | 6/2016 | Sillick | G01V 1/003 367/7 |
| 9,389,327 B2 | 7/2016 | Kroling | |
| 9,720,120 B2 | 8/2017 | Leveille et al. | |
| 2007/0223306 A1 | 9/2007 | Toennessen | |
| 2010/0002538 A1 | 1/2010 | Frivik et al. | |
| 2010/0011864 A1 | 5/2010 | Tenghamn | |
| 2010/0118646 A1 | 5/2010 | Tenghamn | |
| 2010/0118647 A1 | 5/2010 | Tenghamn | |
| 2010/0302900 A1 | 12/2010 | Tenghamn | |
| 2010/0322028 A1 | 12/2010 | Tenghamn | |
| 2011/0007603 A1 | 1/2011 | Frivik et al. | |
| 2011/0158045 A1 | 6/2011 | Karlson et al. | |
| 2011/0199857 A1 | 8/2011 | Garden | |
| 2012/0147699 A1 | 6/2012 | Dellinger et al. | |
| 2013/0170316 A1 * | 7/2013 | Mandroux | G01V 1/3808 367/16 |
| 2013/0333974 A1 | 12/2013 | Coste et al. | |
| 2013/0336087 A1 | 12/2013 | Laws | |
| 2014/0016435 A1 | 1/2014 | Ruet | |
| 2014/0112097 A1 | 4/2014 | Dowle et al. | |
| 2014/0140169 A1 | 5/2014 | Cambois | |
| 2014/0198607 A1 * | 7/2014 | Etienne | G01V 1/247 367/15 |
| 2014/0226439 A1 | 8/2014 | Tenghamn | |
| 2014/0241117 A1 | 8/2014 | Dellinger et al. | |
| 2014/0241123 A1 | 8/2014 | Sallas et al. | |
| 2014/0269173 A1 | 9/2014 | Coste et al. | |
| 2014/0269176 A1 | 9/2014 | Mattsson | |
| 2014/0278116 A1 | 9/2014 | Halliday et al. | |
| 2014/0297190 A1 | 10/2014 | Svay et al. | |
| 2014/0262595 A1 | 11/2014 | Tenghamn | |
| 2014/0334259 A1 | 11/2014 | Tenghamn | |
| 2014/0340985 A1 | 11/2014 | Tenghamn et al. | |
| 2014/0376330 A1 | 12/2014 | Howieson et al. | |
| 2015/0085605 A1 | 3/2015 | Tenghamn | |
| 2015/0085606 A1 | 3/2015 | Tenghamn | |
| 2015/0085607 A1 | 3/2015 | Tenghamn | |
| 2015/0085608 A1 | 3/2015 | Tenghamn et al. | |
| 2015/0185341 A1 | 7/2015 | Rytersson | |
| 2015/0204991 A1 * | 7/2015 | Abma | G01V 1/003 367/7 |
| 2015/0346365 A1 | 12/2015 | Desrues | |
| 2015/0362612 A1 | 12/2015 | Oscarsson | |
| 2015/0369627 A1 | 12/2015 | Oscarsson | |
| 2016/0047923 A1 | 2/2016 | Kroling | |
| 2016/0054465 A1 | 2/2016 | Lamont et al. | |
| 2016/0061973 A1 | 3/2016 | Orji et al. | |
| 2016/0109599 A1 | 4/2016 | Kroling | |
| 2016/0202365 A1 | 7/2016 | Engdahl et al. | |
| 2016/0259072 A1 | 9/2016 | Richer De Forges et al. | |
| 2016/0259073 A1 | 9/2016 | Tenghamn | |
| 2016/0259074 A1 | 9/2016 | Tenghamn et al. | |
| 2016/0306057 A1 | 10/2016 | Kroling | |
| 2016/0327662 A1 | 11/2016 | Bernhardsson et al. | |
| 2016/0327663 A1 | 11/2016 | Bernhardsson et al. | |
| 2016/0327665 A1 | 11/2016 | Bernhardsson et al. | |
| 2017/0363760 A1 | 12/2017 | Mensch et al. | |

FOREIGN PATENT DOCUMENTS

| | | | |
|---|---|---|---|
| CN | 202057806 U | 11/2011 | |
| EP | 0018053 A1 | 10/1980 | |
| GB | 2172997 A * | 10/1986 | G01V 1/08 |
| GB | 2414804 A * | 12/2005 | G01V 1/3817 |
| WO | 2014133509 A1 | 9/2014 | |
| WO | 2015036554 | 3/2015 | |
| WO | 2015136378 | 9/2015 | |
| WO | 2015147965 | 10/2015 | |
| WO | 2016076953 A1 | 5/2016 | |

OTHER PUBLICATIONS

Brazilian Intellectual Property Journal, Preliminary Office Action in Brazilian Patent Application No. BR112018011626-2, Published May 26, 2020; 4 pages.

Lambert, Dale: Seismic Acquisition: Marine seismic survey positioning and control requirements evolve, Offshore Magazine, vol. 63, Issue 3, Mar. 1, 2003.

Musser, James A.: "Streamer Positioning and Spread Stabilization for 4D Seismic", Society of Exploration Geophysicists, 2006.

International Association of Oil & Gas Producers: "An Overview of Marine Seismic Operations", Report No. 448, Apr. 2011.

Panigrahi, S. "Offshore Seismic Data Acquistion".

Petroleum Geo-Services: "Acquisition Technology Snapshots", Tech Link, vol. 9, No. 12, Dec. 2009.

Tippee, Bob; "Broadband acquisition, processing improving marine seismic surveys", Oil&Gas Journal, Nov. 5, 2012.

International Search Report and Written Opinion for International Application No. PCT/2016/079880 dated Mar. 23, 2017; 16 pages.

National Intellectual Property Administration, P.R. China, Chinese Office Action in corresponding application No. 201680081588.5, dated Aug. 21, 2019; 6 pages.

Eurasian Patent Office, Office Action in related Eurasian Patent Application No. 201891130, dated Jan. 24, 2020; 2 pages.

Australian Government, Examination Report No. 1 in related Australian Patent Application No. 2016366485, dated Sep. 14, 2021, 2 pages.

International Search Report and Written Opinion for International Application No. PCT/EP2017/050429 dated Mar. 16, 2017; 13 pages.

National Intellectual Property Administration, P R. China, Chinese Office Action in corresponding appliation No. 201780016576.9, dated Nov. 14, 2019; 13 pages.

Mexican Office Action, for International Application No. MX/a/2018/007082, dated Sep. 20, 2021; 8 pages.

* cited by examiner

GEOPHYSICAL SURVEY SYSTEMS AND RELATED METHODS

CROSS-REFERENCE TO RELATED APPLICATIONS

This application is a divisional of U.S. application Ser. No. 15/280,223 filed Sep. 29, 2016 titled "Geophysical Survey Systems and Related Methods" (now U.S. Pat. No. 10,234,585), which claims the benefit of U.S. Provisional Application Ser. No. 62/265,803 filed Dec. 10, 2015. Both applications are incorporated by reference herein as if reproduced in full below.

BACKGROUND

Geophysical surveying (e.g., seismic, electromagnetic) is a technique where two- or three-dimensional "pictures" of the state of an underground formation are taken. Geophysical surveying takes place not only on land, but also in marine environments (e.g., oceans, large lakes). Marine geophysical surveying systems frequently use a plurality of streamers which contain sensors to detect energy reflected from underground formations below the water bottom. Seismic streamers include sensors for detecting seismic signals reflected from underground formations below the water bottom, including formations containing hydrocarbon deposits.

In terms of area covered by a marine geophysical survey, better economic efficiency is achieved with wider streamer spreads that include a number of sensor streamers. However, in shallow water (e.g., less than about 300 meters) the economic efficiency is offset to some extent by incomplete data for shallow reflectors at the edges of the streamer spread.

BRIEF DESCRIPTION OF THE DRAWINGS

For a detailed description of exemplary embodiments, reference will now be made to the accompanying drawings in which.

Figure 1:
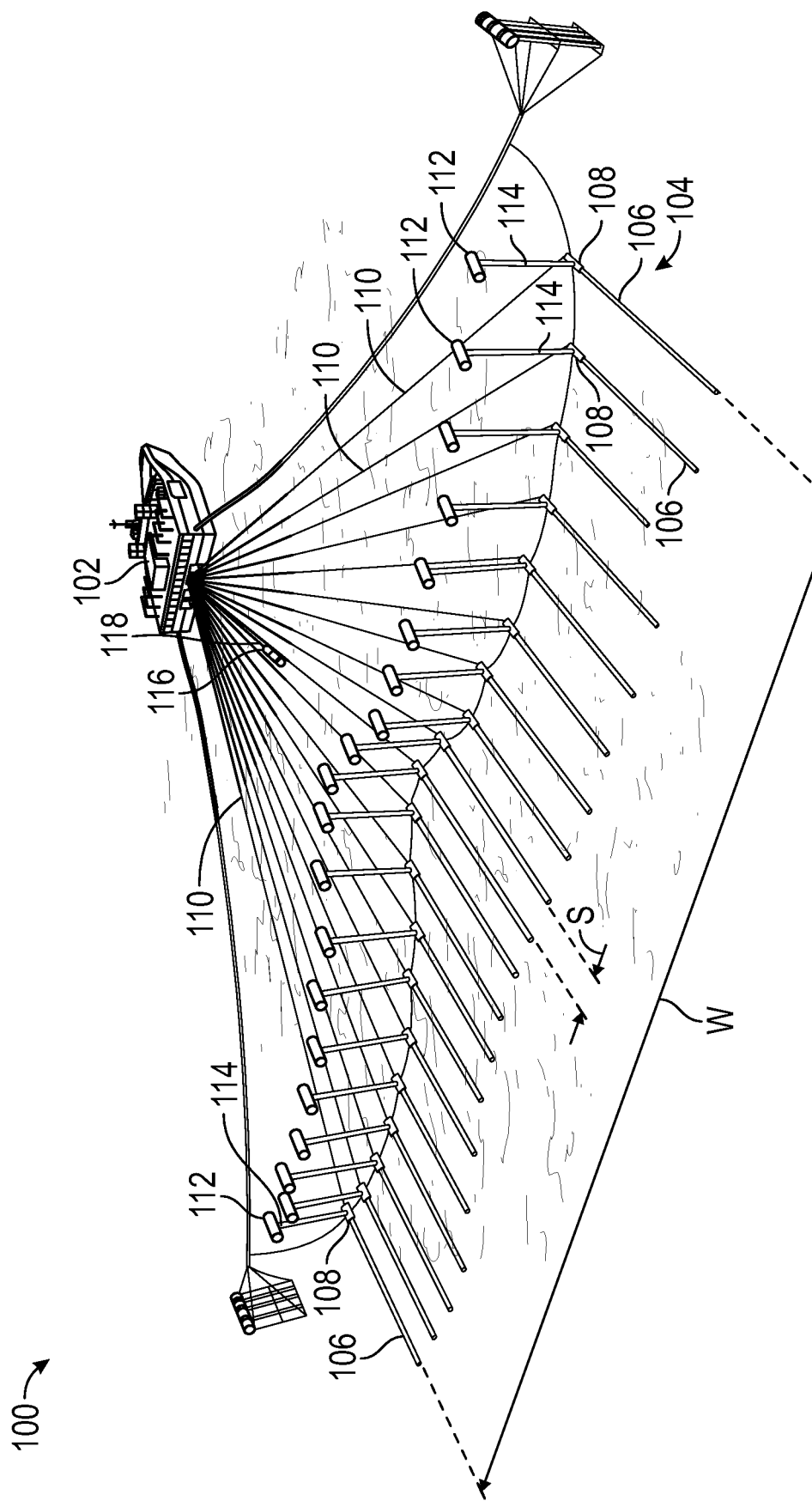
FIG. 1 shows a perspective view of a geophysical survey system.

The various views of the drawings are not necessarily to scale.

Definitions

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "coupled" is intended to mean either an indirect or direct connection. Thus, if a first device is coupled to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Proximal end" in reference to a sensor streamer shall mean an end nearest the tow vessel.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to marine geophysical survey systems using distributed seismic sources to reduce near source-receiver offset issues. More particularly, in some example systems, the seismic sources are pulled by lead vessels coupled at the proximal end of some or all the sensor streamers. That is, in some example embodiments the lead-in cable that couples to a sensor streamer and provides a towing force for the sensor streamer also provides a towing force that pulls the lead vessel and the seismic source coupled to the lead vessel. Having a seismic source at the proximal end of some or all the sensor streamers reduces the source-receiver offset. For example, the inline offset (i.e., the vector offset projected onto the sail line), and/or the cross-line offset (i.e., the vector offset projected onto a direction orthogonal to the sail line) are reduced with seismic sources at the proximal ends of some or all the sensor streamers. In other example systems, the lead vessels and related seismic sources are coupled at the distal end of the sensor streamers. Related methods are directed to firing sequences of the distributed sources, such as simultaneous firing of the seismic sources, sequential firing of the seismic sources, or random or quasi-random firing of the seismic sources. The specification first turns to an example system to highlight near source-receiver offset issues.

FIG. 1 shows a perspective view of an example geophysical survey system 100. In particular, the geophysical survey system of FIG. 1 has a tow vessel 102 towing a streamer spread 104. The example streamer spread 104 comprises a plurality of sensor streamers 106, where each sensor streamer has a plurality of receivers or sensors (not specifically shown) spaced along the sensor streamer. The sensor streamers 106 are each coupled, at the ends nearest the tow vessel 102, to respective lead-in cable terminations 108. The lead-in cable terminations 108 are coupled to or are associated with the spreader lines (not specifically numbered) so as to control the lateral positions of the sensor streamers 106 with respect to each other and with respect to the tow vessel 102. Towing force for the sensor streamers 106, as well as communicative connections between the components in the recording system on the tow vessel and the sensors, is provided by the tow vessel 102 by way of lead-in cables 110. Each sensor streamer also has an associated lead buoy 112 coupled to the proximal end of the respective sensor streamer by way of lines 114. The lead buoys 112 not only mark the proximal end of the sensor streamers, but in some cases also provide depth control for the proximal end of the sensor streamers 106. In most cases the lead buoys 112 are relatively small (e.g., five or six meters) owing to relatively small amount of buoyancy needed to support the proximal ends of the sensor streamers 106.

The example system of FIG. 1 also comprises a seismic source 116. The seismic source 116 is towed by dedicated tow cable 118 coupled between the seismic source 116 and the tow vessel 102. The tow cable 118 that pulls the seismic source 116 may include an umbilical with tubing to provide compressed air to the seismic source (e.g., air at 2000 pounds per square inch gauge (psig)) in addition to electrical power and communicative pathways. The tow cable for the seismic source 116 is sometimes referred to as "gun umbilical cable." Because of the various components, the tow cable 118 for the seismic source 116 may have significantly greater diameter than, for example, lead-in cables 110, and thus towing force for the tow cable 116 is higher than for an equivalent length of lead-in cable 110.

The streamer spread 104 may include many sensor streamers 106, and in the example system shown the streamer spread 104 includes 20 sensor streamers 106 (and related lead-in cables 110 and lead buoys 112). In many cases the spacing S between adjacent sensor streamers 106 may be between 25 and 200 meters, usually about 100 meters (measured perpendicular to the sail line of the tow vessel), and thus for the example streamer spread 104 having 20 sensor streamers the overall width W (again measured perpendicular to the sail line) may be about two kilometers.

While FIG. 1 shows the seismic source 116 as a single entity, in many cases the seismic source 116 is made of two or more separately towed source arrays. Thus, each source array may have its own tow cable directly coupled the tow vessel, and each source array may have steering capability to separate the source arrays from each other. For source arrays towed directly by the tow vessel 102, the separation between the source arrays may be about 50 meters. Nevertheless, the separation between the source arrays is relatively small in comparison to the separation S between the sensor streamers 106 and the overall width W of the streamer spread 104. Because of the scale of the separation between source arrays compared to the scale of the separation S between the sensor streamers, for many cases where the seismic source 116 is towed behind the tow vessel 102 the seismic source 116 resides between the innermost sensor streamers, but the positioning of the seismic source 116 is not so far back as to tangle with the lead buoys 112 and lines 114 for the innermost sensor streamers 106.

The position of a seismic source 116 towed directly by the tow vessel 102 in combination with streamer spreads having a large width W creates issues in geophysical surveys in shallow water and for relatively shallow underground reflectors. In particular, and still referring to FIG. 1, the source-receiver offset between the seismic source 116 and receivers (not specifically shown) on the innermost sensor streamers 106 is relatively short (e.g., 100 to 300 meters); however, the source-receiver offset between the seismic source 116 and the receivers on the outermost sensor streamers is significant. For the example system of FIG. 1, with 100 meter separation S between the sensor streamers 106 the source-receiver offset for the outermost sensor streamers may be on the order of about 1 kilometer. However, for shallow underground reflectors in shallow water the largest usable near source-receiver offset may be about 500 meters, and thus the outer sensor streamers may be unusable. It follows that the recorded data may contain swaths of unusable or missing data between the sail lines for shallow water and shallow underground reflectors.

Figure 2:
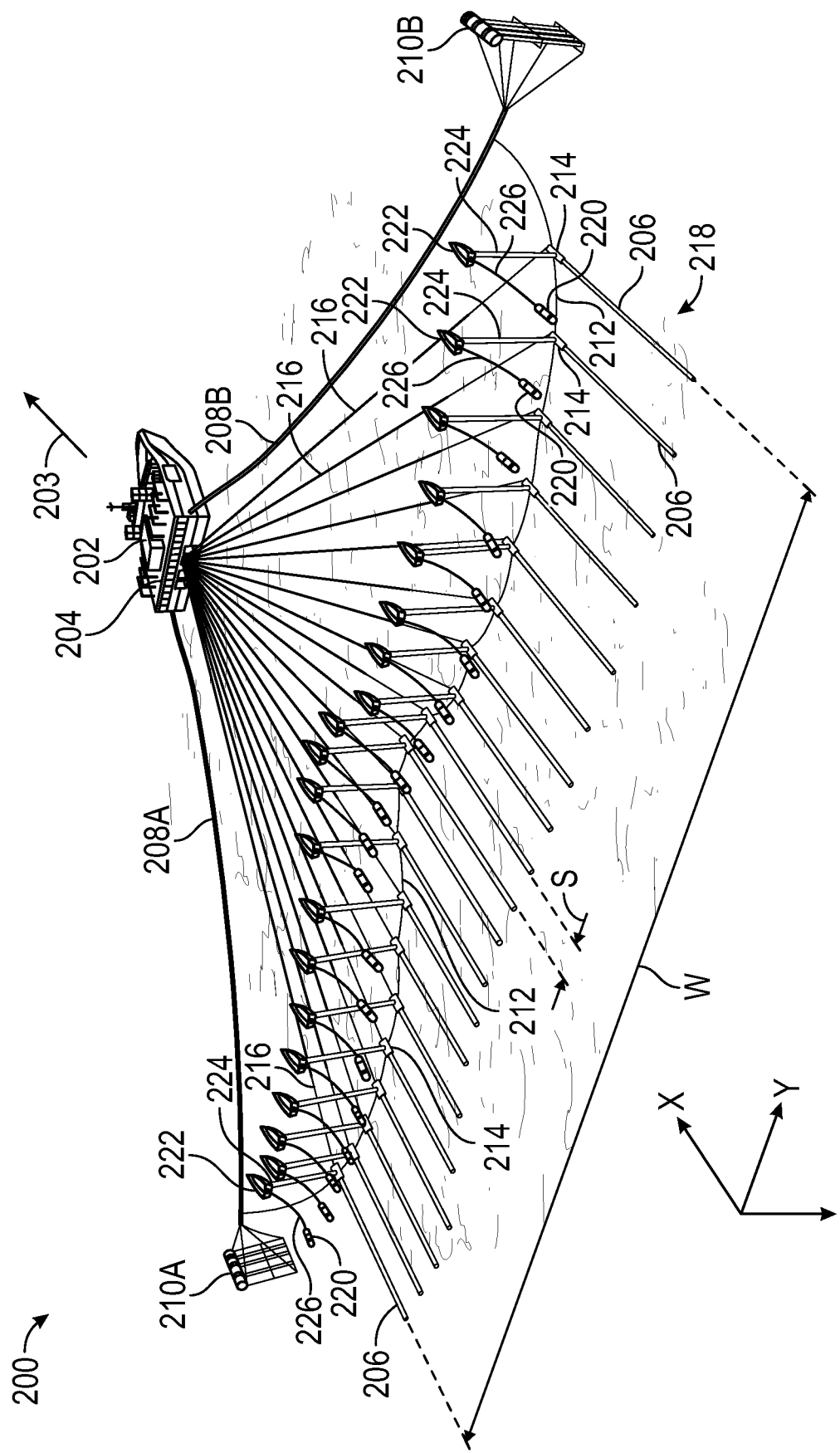
FIG. 2 shows a perspective view of a geophysical survey system in accordance with at least some embodiments.

The issues noted above are addressed, in large part, by a new geophysical surveying systems (and related methods) that distribute the seismic sources to be associated with some or all the sensor streamers. FIG. 2 shows a perspective view of a geophysical survey system 200 in accordance with example embodiments. In particular, FIG. 2 shows a tow vessel 202 having onboard equipment 204, such as navigation, energy source control, and data recording equipment. Tow vessel 202 is configured to tow a plurality of sensor streamers 206 through the water, with the path of the tow vessel 202 referred to as a sail line 203. While FIG. 2 illustratively shows 20 sensor streamers 206, greater or fewer numbers of sensor streamers may be used.

The sensor streamers 206 are coupled to towing equipment that maintains the sensor streamers 206 at selected lateral positions with respect to each other and with respect to the tow vessel 202. The towing equipment may comprise two paravane tow lines 208A and 208B each coupled to the tow vessel 202 by way of winches (not specifically shown). The winches may enable changing the deployed length of each paravane tow line 208A and 208B. The second end of paravane tow line 208A is coupled to a paravane 210A, and the second end of paravane tow line 208B is coupled to paravane 210B (the paravanes sometimes referred to as "doors.") In each case, the paravane tow lines 208A and 208B couple to their respective paravanes through respective sets of lines called a "bridle" (shown but not specifically numbered). The paravanes 210A and 210B are each configured to provide a lateral force component to the various elements of the survey system when the paravanes are towed through the water. The combined lateral forces of the paravanes 210A and 210B separate the paravanes from each other until the paravanes put one or more spreader lines 212, coupled between the paravanes 210A and 210B, into tension.

The sensor streamers 206 are each coupled, at the ends nearest the tow vessel 202 to a respective lead-in cable termination 214. The lead-in cable terminations 214 are coupled to or are associated with the spreader lines 212 so as to control the lateral positions of the sensor streamers 206 with respect to each other and with respect to the tow vessel 202. Electrical and/or optical connections between the appropriate components in the onboard equipment 204 and the sensors (not specifically shown) in the sensor streamers 206 may be made using inner lead-in cables 216. Moreover, each lead-in cable 216 provides towing force for its respective sensor streamer 206 as the tow vessel 202 tows the streamer spread 218 during a geophysical survey. Much like the tow lines 208A and 208B associated paravanes 210A and 210B, each of the lead-in cables 216 may be deployed by a respective winch or similar spooling device (not specifically shown) such that the deployed length of each lead-in cable 216 can be changed, such as during turns of the tow vessel 202.

The length of each sensor streamer 206 is fixed for a particular geophysical survey, but the length of the sensor streamer may range from as short as a few thousand meters, to lengths of 10,000 meters or more in other cases. In many cases, the spacing S between adjacent sensor streamers 206 may be between and including 25 to 200 meters, in many cases about 100 meters (measured perpendicular to the sail line of the vessel), and thus for the example streamer spread 218 having 20 sensor streamers 206 the overall width W (again measured perpendicularly to the sail line) may be about two kilometers.

In various embodiments discussed herein, each sensor streamer 206 may comprise sensors in the form of a plurality of hydrophone-velocity sensor pairs spaced along the sensor streamer. That is, each sensor of a sensor streamer 206 may comprise a hydrophone and co-located velocity sensor. A hydrophone is a device which creates an output signal (e.g., electrical, optical) proportional to pressure sensed by the hydrophone, and more particularly to changes in pressure proximate the hydrophone as acoustic signals traveling in the water pass the hydrophone. A velocity sensor shall mean a device which senses particle motion, and produces an output signal (e.g., electrical, optical) responsive to small movements, velocity, and/or acceleration as acoustic signals travelling in the water pass the sensor. Thus, the velocity sensor may likewise be an accelerometer, and can be implemented in any suitable form, such as piezoelectric accelerometers, micro electro-mechanical system (MEMS) accelerometers, and so on. In most cases the hydrophone and velocity sensor of a pair are within a few centimeters of each other (e.g., 10 centimeters), but closer spacing and longer spacing is also contemplated. In some cases, the velocity sensor is responsive only to movements/acceleration in the vertical direction (e.g., a z-component sensor); however, in other cases the sensor may be sensitive to all directions. In yet still other cases, the velocity sensors may be omitted and only hydrophones may be used. In some cases, a plurality of hydrophones may be wired together in groups such that the group of hydrophones represents one channel in the recording system.

The sensors of the sensor streamer detect seismic energy reflected from underground reflectors (such as interfaces between rock formations having different acoustic properties). Unlike the situation of FIG. 1 where the seismic source 116 is towed directly by the tow vessel 102 between the two innermost sensor streamers 106, in accordance with example systems the seismic sources are distributed across the streamer spread 218. In the example system of FIG. 2, each sensor streamer has an associated seismic source 220 pulled by a lead vessel 222 (other arrangements are discussed below). In particular, each sensor streamer 206 has associated therewith a lead vessel 222 floating at or near surface of the body of water. In the example system of FIG. 2 the lead vessel 222 is coupled to the proximal end of its associated sensor streamer 206 by way of a tow cable 224 that extends between the proximal end of the sensor streamer 206 (in some cases the lead-in cable termination 214) and the lead vessel 222. The seismic source 220 is in the water behind the lead vessel 222, with the seismic source 220 coupled to the lead vessel by a source cable 226 that extends from the lead vessel 222 to the seismic source 220.

Unlike the systems of FIG. 1 where the seismic source 116 is towed directly behind the tow vessel 102 by a tow cable 118 in the form of a gun umbilical cable, in the example system of FIG. 2 each seismic source 220 is pulled by a lead vessel 222. The lead vessel 222 is pulled by the tow cable 224 and the respective lead-in cable 216. Stated oppositely, the tow vessel 202 provides a towing force along the lead-in cable 216 that pulls not only the sensor streamer 206, but also pulls the tow cable 224, which pulls the lead vessel 222, which pulls the source cable 226, which pulls the seismic source 220. It follows that while the tow vessel 202 tows all the sources, the towing force is propagated along a host of other components in the overall streamer spread 218.

Distributing the seismic sources 220 to be associated with some or all sensor streamers addresses the near source-receiver offset issue. For the example case of FIG. 2, with each sensor streamer 206 having an associated seismic source 220, the near source-receiver offset for each sensor streamer 206 is significantly shorter than situations where the seismic source is situated between the innermost sensor streamers of the streamer spread (and closer to the tow vessel 202). Consider, for example, the sensor streamer 206 on the far left side in the view of FIG. 2. Since the sensor streamer 206 has an associated seismic source 220 pulled by the lead vessel 222, the near source-receiver offset may be only a few hundred meters or less depending on the location of the first sensor in the sensor streamer 206. In the example system of FIG. 2, a near source-receiver offset for all the sensor streamers 206 is about the same, and relatively short. By comparison, the near source-receiver offset in the system of FIG. 1 for the outermost sensor streamers may be on the order of one kilometer. The near source-receiver offset implemented in the example system of FIG. 2 means that even for surveys in shallow water having relatively shallow underground reflectors, the data gathered may span substantially the entire width W of the streamer spread.

Figure 3:
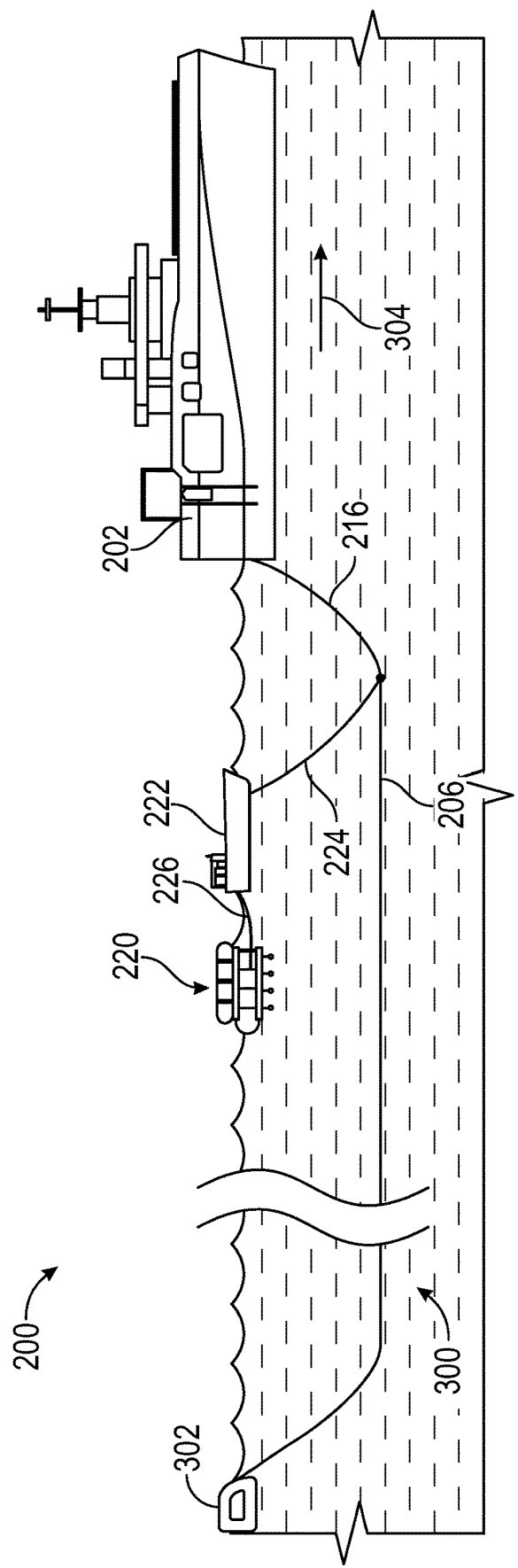
FIG. 3 shows a side elevation view of a geophysical survey system in accordance with at least some embodiments.

FIG. 3 shows a side elevation view of the geophysical survey system 200 of FIG. 2. In particular, visible in FIG. 3 are the tow vessel 202, a sensor streamer 206, a lead vessel 222 associated with the sensor streamer 206, and a seismic source 220 associated with the sensor streamer 206 and the lead vessel 222. While only one sensor streamer 206 and associated lead vessel and source are visible in FIG. 3 (e.g., the outermost sensor streamer 206 on the right in FIG. 2), the description that follows is equally applicable to all the sensor streamers 206 and associated equipment. As shown in FIG. 3, the tow vessel 202 couples to the sensor streamer 206 and other equipment by the lead-in cable 216. The lead vessel 222 couples to the lead-in cable 216 by way of tow cable 224. The seismic source 220 couples to the lead vessel 202 by way of source cable 226. In the example system of FIG. 3, the distal end 300 of the sensor streamer 206 couples to a tail buoy 302 which not only marks the end of the sensor streamer 206 for navigation purposes, but the tail buoy may also have GPS position location equipment such that the onboard equipment 204 (FIG. 2) in the tow vessel 202 can record with certainty the location of the distal end of each sensor streamer 206.

The tow vessel 202 provides towing force for all the equipment shown, and the tow vessel tows the equipment along a direction of tow 304. That is, in the example system the tow vessel 202 tows everything shown by way of the lead-in cable 216. More particularly, the sensor streamer 206 is pulled by the lead-in cable 216. The lead vessel 222 is pulled tow cable 224, and tow cable 224 is pulled by lead-in cable 216. The seismic source 220 is pulled by source cable 226 coupled to lead vessel 222, and again lead vessel 222 is pulled tow cable 224 and tow cable 224 is pulled by lead-in cable 216. A few points before proceeding. First, as discussed with respect to FIG. 2, the spreader lines 212 (FIG. 2) and paravanes 210 (FIG. 2) provide a lateral force component for spacing the proximal ends of the various sensor streamers 206. While the majority of the towing force for the sensor streamer 206, lead vessel 222, and seismic source 220 are provided through the lead-in cable 216 in the example system, depending on the angles and the state of the system (e.g., turning of the tow vessel 202), a small portion of the towing force applied to the sensor streamer 206 and tow cable 224 may be provided by the spreader lines 212 and paravanes 210 (FIG. 2). The small portion of the towing force provided by the lateral spacing components shall not obviate that the various components are pulled by the lead-in cable 216. Second, regardless of whether the entire towing force is along the lead-in cable 216, or shared between the lead-in cable 216 and the lateral spacing components, the towing force nevertheless originates with the tow vessel 202.

Figure 4:
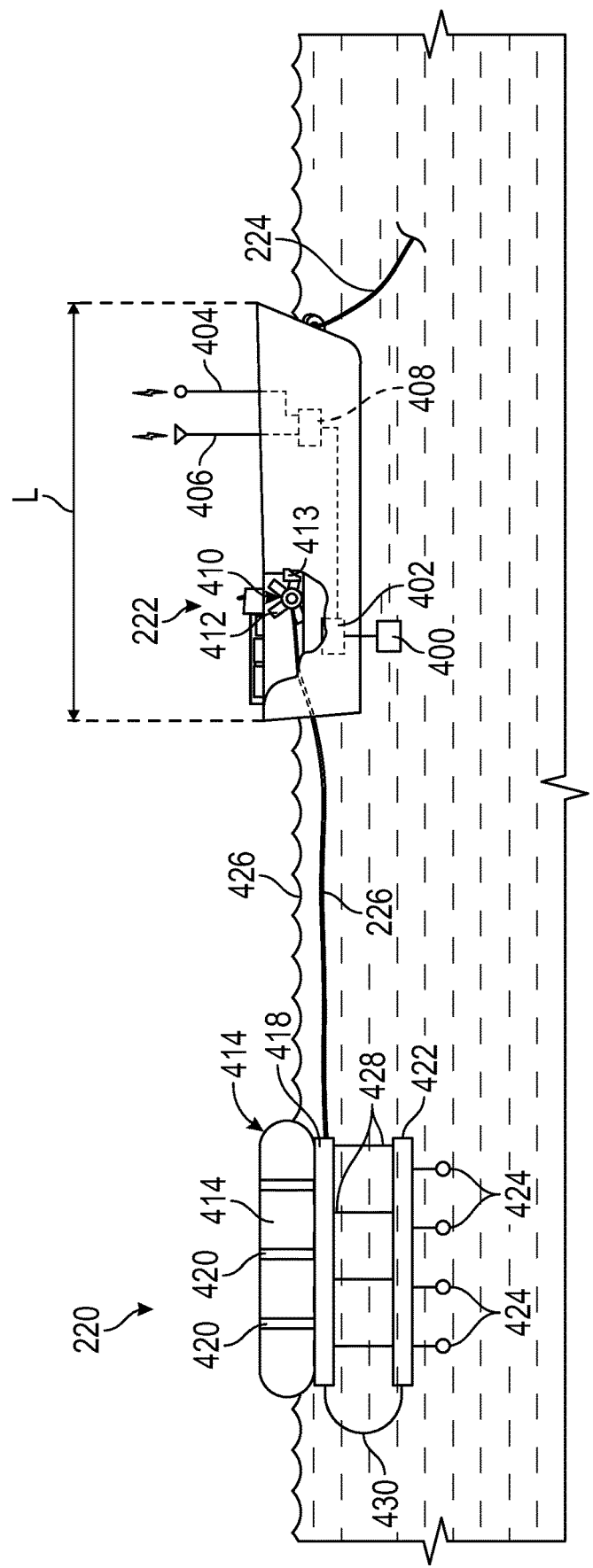
FIG. 4 shows a side elevation (partial cutaway) view of a lead vessel and seismic source in accordance with at least some embodiments.

FIG. 4 shows a side elevation, partial cutaway, view of the lead vessel 222 and related components in accordance with example embodiments. In particular, FIG. 4 shows in greater detail the lead vessel 222 and an example seismic source 220. The example lead vessel 222 takes the form of a small work boat. While the lead-vessel 222 may have a propulsion system (e.g., internal combustion engine coupled to a propeller disposed in the water), during a geophysical survey in accordance with example embodiments the propulsion system is not used, and instead the force to move the lead vessel 222 and the seismic source 220 is provided from the tow vessel 202 (FIG. 2) by way of the tow cable 224. During deployment and retrieval of the streamer spread 218, the propulsion system could be used. Nevertheless, each lead vessel may comprise a rudder 400 and related rudder positioning equipment 402 to provide lateral control and placement of the lead vessel 222 (and thus the associated seismic source 220) during geophysical surveys. Control of the lateral position may be by onboard equipment 204 of the tow vessel 202 (FIG. 2) communicating rudder position commands along the communicative channels within the lead-in cable 216 (FIG. 2) and tow cable 224. In other cases, rudder position commands may be communicated between the onboard equipment 204 of the tow vessel 202 and the lead vessel 222 by way of wireless communication, such as illustrated by antenna 404. In other cases, the onboard equipment 204 in the tow vessel 202 may provide a course to a position control system 408 within the lead vessel 222, and the position control system 408 may: communicate with a GPS system to determining position (such as by determining position using GPS antenna 406); and implement rudder position control based on a previously assigned course. The amount of lateral position control that may be implemented by the lead vessel 222 is bounded to some extent by length of the tow cable 224, and in most cases it is contemplated that if position control is implemented by the lead vessel 222, the position control will likely be to ensure the path of travel of the lead vessel 222 and seismic source 220 is directly over the underlying sensor streamer (not shown in FIG. 4). In yet still further cases, the towing of the lead vessel may be passive in the sense the rudder of the lead vessel is not controlled during towing.

In example systems, each lead vessel 222 has a non-planing displacement hull, in most cases a V-bottom type hull, but other hull types for the lead vessel are possible (e.g., round-bottom, flat-bottom, catamaran). The hull type need not be consistent across all the lead vessels in an overall streamer spread. In example systems, each lead vessel 222 has a length L of between and including 10 and 20 meters (by contrast, the lead buoys 112 in the system of FIG. 1 may be less than 10 meters long, and in most cases five to six meters long). The length of the lead vessel 222 thus enables placement of certain equipment within the lead vessel 222 which further enables distribution of the seismic sources, as discussed immediately below.

Still referring to FIG. 4, the example lead vessel 222 comprises a source of energy 410 operatively coupled to the seismic source 220 by way of the source cable 226. In one example case, and as shown in FIG. 4, the source of energy 410 is an air compressor 412 disposed within the lead vessel 222. In some cases, the air compressor 412 is turned by an internal combustion engine 413 also disposed within the lead vessel. Compressed air from the air compressor 412 is operatively coupled to the seismic source 220 by way of the source cable 226. It follows that in the example system the seismic source 220 is a source that uses compressed air to create the seismic energy. In the example shown in FIG. 4, the seismic source 220 is a source array 414. More particularly, the source array 414 comprises a buoy 416 coupled to an upper frame member 418, such as by straps 420. Suspended below the upper frame member 418 is a lower frame member 422, and suspended below the lower frame member 422 are a plurality of air guns 424. While only four air guns are shown, in some cases the source array 414 may have between and including two and ten air guns. It follows from the physical connections that the plurality of air guns 424 are suspended beneath the surface 426 of the body of water. The depth of the lower frame member 422 (and thus the air guns 424) may be controlled by cables that couple the upper and lower frame members. Compressed air and control signals for the plurality of air guns 424 may be provided along the source cable 226, and then through umbilical 430. Thus, seismic energy is selectively created based on the delivery of compressed air (and control signals) to the air guns 424. While FIG. 4 shows a single source array 414, in other cases multiple source arrays may be pulled behind each lead vessel, with the number of source arrays selected to achieve the desired energy output.

As mentioned previously umbilical cables that include hoses for transferring compressed air have greater diameters than sensor streamers. By having an air compressor 412 in each respective lead vessel 222, and given the low towing force used for the lead vessels 222 and relatively short source cables 226, the seismic sources 220 may be placed at significantly greater distances from the tow vessel 202 compared to, for example, attempting to supply compressed air from the tow vessel 202 to the most distance sensor streamers (a kilometer or more in the example system of FIG. 2).

Figure 5:
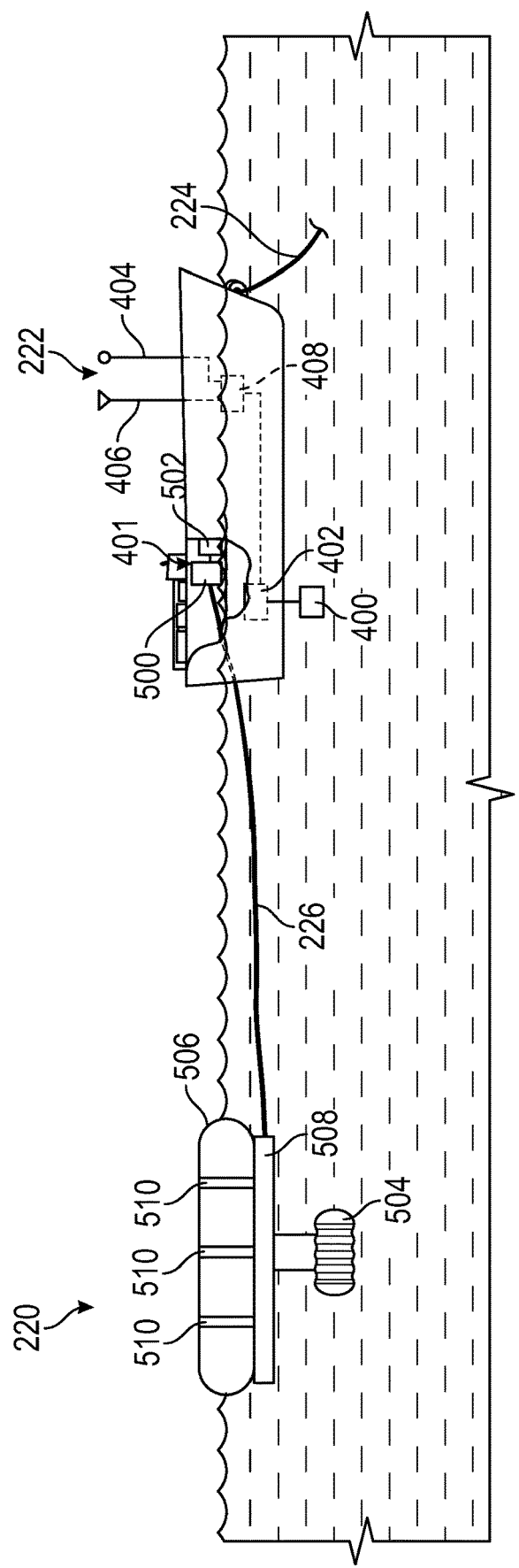
FIG. 5 shows a side elevation (partial cutaway) view of a lead vessel and seismic source in accordance with at least some embodiments.

FIG. 5 shows a side elevation, partial cutaway, view of a lead vessel 222 and related components in accordance with other example embodiments. In particular, FIG. 5 shows an example lead vessel 222 and an example seismic source 220. As with the system of FIG. 4, the example lead vessel 222 of FIG. 5 takes the form of a small work boat. The description of FIG. 4 regarding the lead vessel 222, its propulsion system, the boat type, boat length, and the control of lateral position is equally applicable to the system of FIG. 5, and will not be repeated so as not to unduly lengthen the specification The example lead vessel 222 of FIG. 5 also comprises a source of energy 410 operatively coupled to the seismic source 220 by way of the source cable 226. However, in the case of FIG. 5 the source of energy 410 is an electrical generator 500 disposed within the lead vessel 222. In some cases, the electrical generator is turned by an internal combustion engine 502 also disposed within the lead vessel. Electrical energy from the electrical generator 500 is operatively coupled to the seismic source 220 by way of the source cable 226. It follows that in the example system the seismic source 220 is a source that uses electrical energy to create the seismic energy. In the example shown in FIG. 5, the seismic source 220 is a marine vibrator 504. More particularly, the marine vibrator 504 is suspended beneath a buoy 506 coupled to an upper frame member 508, such as by straps 510. The depth of the marine vibrator 504 may be controlled by cables that couple the marine vibrator 504 to the upper frame member 508. Electrical energy for the marine vibrator is provided along the source cable 226. Thus, seismic energy is selectively created based on the delivery of the electrical energy to the marine vibrator 504.

Still referring to FIG. 5, in yet still other cases, and depending on the amount of electrical energy used by the marine vibrator 504, the electrical energy may be supplied from the tow vessel 202 (FIG. 2) along the lead-in cable 216, then along tow cable 224, then along source cable 226 to the marine vibrator 504. Thus, in such embodiments the electrical generator 500 may be omitted, yet the lead-vessel 222 still used as shown in FIG. 5. In some systems, each lead vessel and seismic source will be of the same type. However, in other cases the seismic source associated with each lead vessel need not be the same, and thus the overall streamer spread may contain seismic sources in the form of air guns and marine vibrators.

Figure 6:
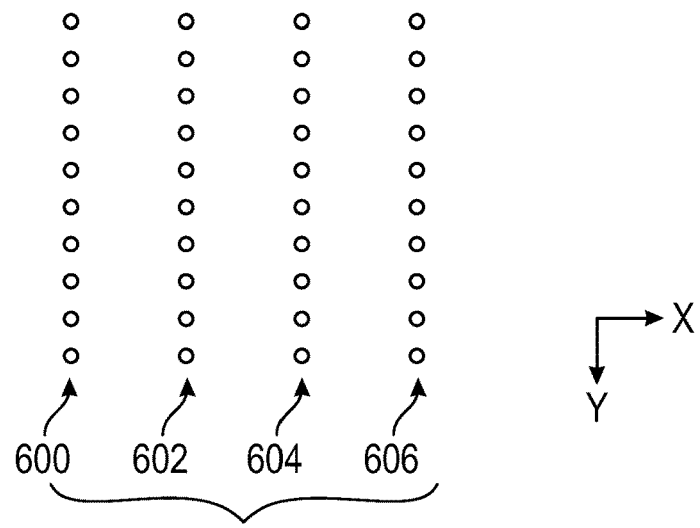
FIG. 6 shows an illustration of timing of activation of seismic sources in accordance with at least some embodiments.

The specification now turns to operational aspects of example systems. In particular, and as discussed above, in the example systems the tow vessel 202 provides the towing force for the streamer spread 218, as well as the lead vessels 222 and associated seismic sources 220. Thus, the tow vessel 202 tows the streamer spread 218 and related equipment along the sail line while the seismic sources 220 are activated. Activating the plurality of seismic sources 220 may take many forms. In one example operational method, the seismic sources 220 are activated simultaneously. FIG. 6 shows an overhead view depicting location of each seismic source at the time of activation for system having an example ten seismic sources, and with those seismic sources being activated simultaneously. In particular, consider that a tow vessel (not shown) is travelling from left to right on the plane of the page of FIG. 6 towing a streamer spread with the seismic sources spread about the streamer spread. A first column of dots 600 depicts a location of the seismic sources for a first simultaneous activation of all the sources. That is, each dot in the column of dots represents a location of a single seismic source when the seismic source is activated. Thus, all the sources are activated simultaneously. At some later time (e.g., 10 seconds to a few minutes depending on the depth of underground reflectors of interest) the sources are simultaneously activated again, and because of movement of the tow vessel the location of the seismic sources is changed from the first activation. Thus, FIG. 6 shows a second column of dots 602 that depicts location of the seismic sources for a second simultaneous activation of the sources. Columns of dots 604 and 606 likewise depict locations of the seismic sources at a respective third and fourth simultaneous activation of the seismic sources. "Simultaneous" activation in reference to FIG. 6 (and cases below where two or more sources are activated "simultaneously") shall also include dithered activation. That is, "simultaneous" activation shall also include situations where a plurality of source arrays are activated within a time window, with the amount of delay between the activations within the time window precisely controlled yet the activations still considered "simultaneous."

Figure 7:
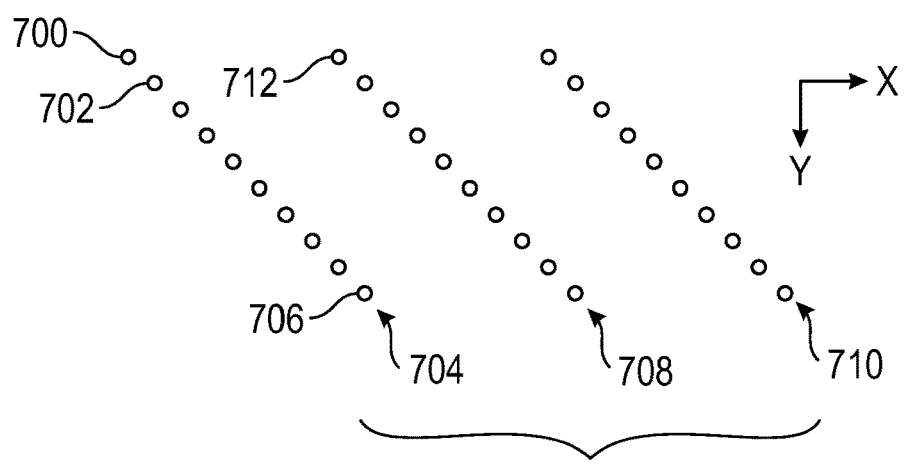
FIG. 7 shows an illustration of timing of activation of seismic sources in accordance with at least some embodiments.

Simultaneously activating the seismic sources may be useful in certain situations; however, for a large number of seismic sources the differing path lengths to each underground reflector may create difficulties during processing of the seismic data. Thus, in yet still further example operational methods, the seismic sources may be activated sequentially. FIG. 7 shows an overhead view depicting location of seismic sources at the time of activation for system having an example ten seismic sources being activated sequentially. In particular, consider that a tow vessel (not shown) is travelling from left to right on the plane of the page of FIG. 7 towing a streamer spread with the seismic sources spread about the streamer spread. A first seismic source is activated (as shown by dot 700) as the streamer spread continues to travel through the water, and after a predetermined period of time (e.g., a few seconds to a few minutes) an adjacent seismic source is activated (as shown by dot 702), and so on along all the seismic sources. The sequential firing results in a diagonal series of dots 704 depicting the location of each seismic source at activation for the sequential activation. In the example methods, as soon as the last seismic source is activated (as shown by dot 706), the sequential activation begins anew, as illustrated by the second diagonal series of dots 708, and the third diagonal series of dots 710.

Sequentially activating the seismic sources may be useful in certain situations; however, for a large number of seismic sources, and depending on the depth of the underground reflectors of interest, the time between activations of a particular seismic source may be too long to achieve suitable data coverage in the vicinity of the seismic source. Consider, as an example, a seismic source activation represented by dot 700 and activation of the same seismic source after activation of all the other seismic sources as represented by dot 712. If too much time elapses between these activations of the seismic source, the reflections of seismic energy from underground reflectors beneath the path of travel of the seismic source may be too sparse to adequately image the underground reflectors. The example of FIG. 7 has only ten seismic sources. The issues regarding the period of time between activations of particular sources (and sources near the particular sources) is exacerbated when additional seismic sources are present and/or with increasing the depth of the underground reflectors of interest.

Figure 8:
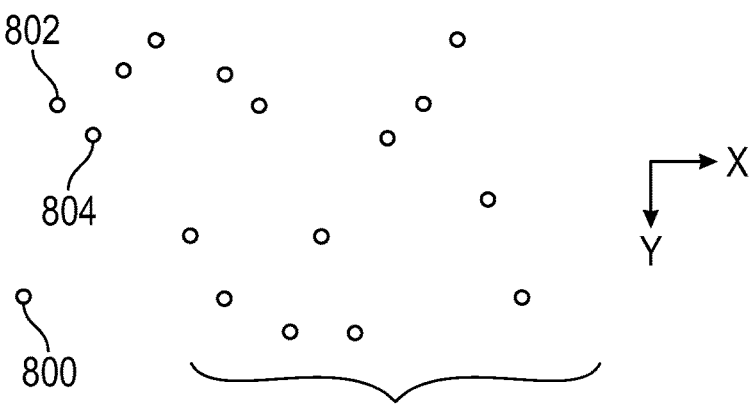
FIG. 8 shows an illustration of timing of activation of seismic sources in accordance with at least some embodiments.

FIG. 8 shows an overhead view depicting locations of seismic sources at the times of their activations in a system having an example ten seismic sources being activated in a either a random or a quasi-random manner. "Random" in this context refers to a sequence wherein each value is independent of the prior values—that is, the values in the sequence are statistically uncorrelated, to the extent computers are capable of producing such sequences. "Quasi-random" in this context refers to a sequence having the appearance of randomness (i.e., the values exhibit no discernable pattern), but possibly having some statistical distribution imposed thereon such that the values in the sequence may be more uniformly distributed than uncorrelated "random" values, so as to reduce the occurrences of clumps of similar values. Consider that a tow vessel (not shown) is travelling from left to right on the plane of the page of FIG. 8 towing a streamer spread with the seismic sources spread about the streamer spread. In the random or quasi-random firing, a computer system may generate a random or quasi-random number selected from a set consisting of the number of seismic sources in the streamer spread, and activates the selected seismic source. In the example shown in FIG. 8, if the source at the top of the figure is seismic source one, and the source at the bottom of the figure is seismic source ten, the first activation in the example shown is of seismic source nine, as illustrated by dot 800. The second activation in the example is of seismic source three, as illustrated by dot 802. The third activation in the example is of seismic source four, as illustrated by dot 804, and so on. Random or quasi-random activation have certain advantages in later data processing, such as data processing using the method known as compressive (or compressed) sensing.

Any of the activation schemes shown FIGS. 6-8 could be dense or sparse. Sparse activation shall mean situations where the inline distance (i.e., the distance survey vessel moves along the sail line 203) between activation of seismic source(s) of the survey is more than about 20 meters. That is, the distance the tow vessel travels along the sail between a first activation of seismic source(s) and an immediately subsequent activation of seismic source(s) is more than 20 meters. By contrast, a dense activation shall mean situations where the inline distance (i.e., the distance survey vessel moves along the sail line 203) between activation of seismic source(s) of the survey is less than 20 meters, and in some cases between 10 and 15 meters. That is, the distance the tow vessel travels along the sail between a first activation and an immediately subsequent activation of seismic source(s) is between and including 10 and 15 meters. So for example, and referring to FIG. 8, if the survey vessel travels 20 meters or more (in the X direction of FIG. 8) between activation of seismic source illustrated by dot 802 and the activation illustrated by dot 804, and the remaining activations have similar spacing, such would be considered sparse activation. By contrast, if the survey vessel travels 12.5 meters (in the X direction of FIG. 8) between activation of seismic source illustrated by dot 802 and the activation illustrated by dot 804, and the remaining activations have similar spacing, such would be considered dense activation.

As shown in FIG. 8, the random or quasi-random activation is a sparse activation, which in this case means that only one seismic source is activated in each activation period. In yet still other cases, the random or quasi-random activation may be dense, meaning that within each activation period multiple seismic sources (e.g., three, four) may be activated.

The descriptions of the activation methods with respect to FIGS. 7 and 8 assume only a single seismic source is fired at any one time; however, in yet still further embodiments multiple seismic sources (but less than all the seismic sources) may be activated in the example patterns of FIGS. 7 and 8. For example, source 700 may represent two or three adjacent seismic sources fired simultaneously, and yet the "sequential" pattern of firing may be applied across the groups of adjacent seismic sources. Likewise, the random or quasi-random activation illustrated by FIG. 8 may be implemented by simultaneous activation of a predetermined number of the plurality of sources, where the seismic sources constituting the predetermined number of sources are randomly or quasi-randomly selected. For example, at a first location three seismic sources may be simultaneously activated, and the three seismic sources are randomly or quasi-randomly selected from the group consisting of all the seismic sources. At a subsequent location another three seismic sources may be simultaneously activated, and again the three seismic sources are randomly or quasi-randomly selected from the group consisting of all the seismic sources.

Figure 9:
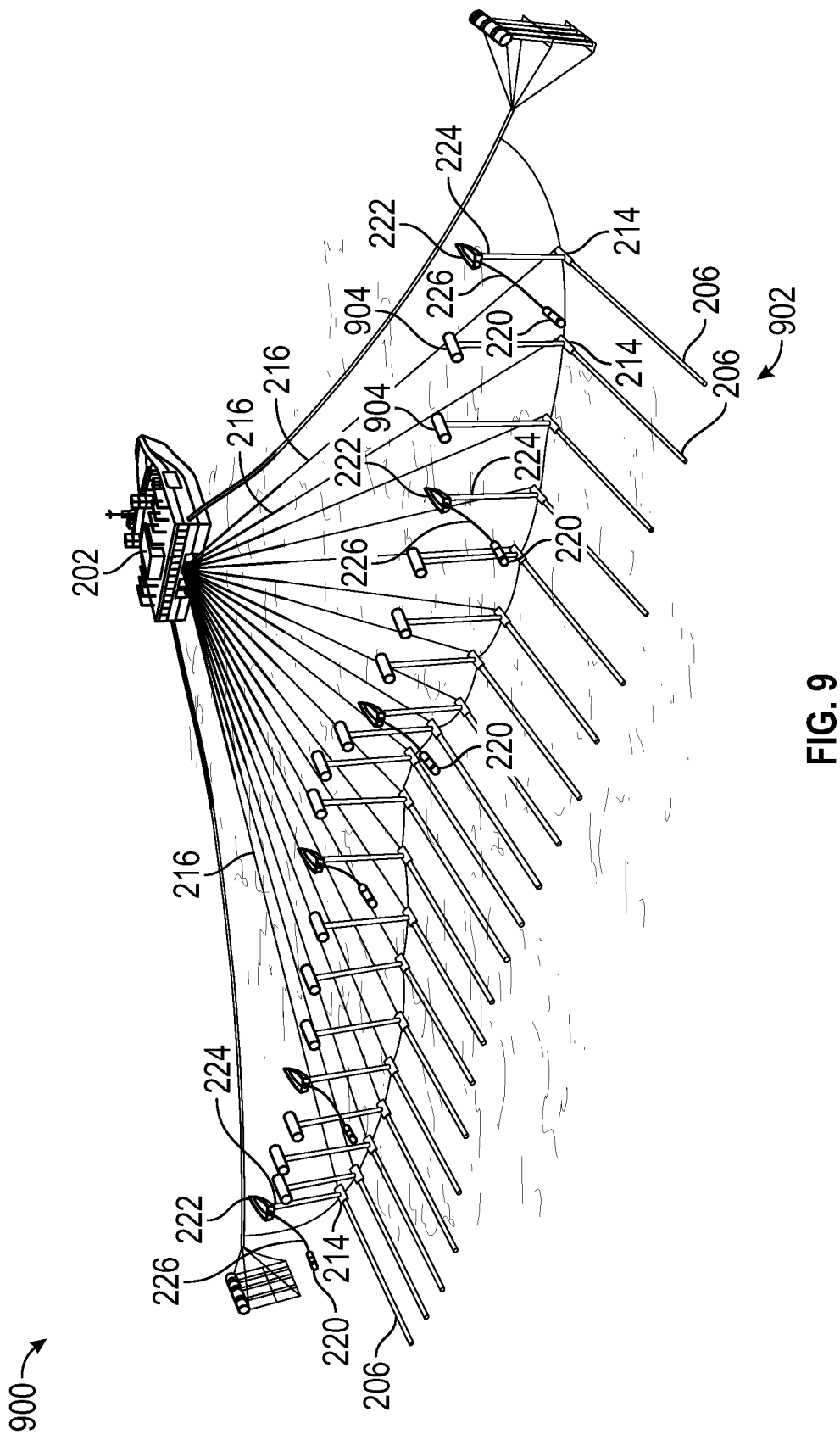
FIG. 9 shows a perspective view of a geophysical survey system in accordance with at least some embodiments.

The specification now turns to further example systems in accordance with various embodiments. In particular, FIG. 9 shows a geophysical survey system 900 in accordance with example embodiments. In particular, FIG. 9 shows tow vessel 202 such as described with respect to FIG. 2. Tow vessel 202 is configured to tow a plurality of sensor streamers 206 through the water. Much like the system of FIG. 2, the sensor streamers 206 are coupled to towing equipment that maintains the sensor streamers 206 at selected lateral positions with respect to each other and with respect to the tow vessel 202. Moreover, the sensor streamers 206 are each coupled, at the ends nearest the tow vessel 202 (i.e., the "proximal ends") to a respective lead-in cable termination 214. The lead-in cable terminations 214 are coupled to or are associated with the spreader lines (not specifically number) so as to control the lateral positions of the sensor streamers 206 with respect to each other and with respect to the tow vessel 202. Electrical and/or optical connections between the appropriate components in the onboard equipment and the sensors (not specifically shown) in the sensor streamers 206 may be made using inner lead-in cables 216. Moreover, each lead-in cable 216 provides towing force for its respective sensor streamer 206 as the tow vessel 202 tows the streamer spread 902 during a geophysical survey.

In the example system shown, some but not all the sensor streamers 206 have associated therewith a lead vessel 222 floating at or near surface of the body of water. Where lead vessels are used, the lead vessel 222 is coupled to the proximal end of its associated sensor streamer 206 by way of a tow cable 224 that extends between the proximal end of the sensor streamer 206 (in some cases the lead-in cable termination 214) and the lead vessel 222. A seismic source 220 is in the water behind its respective lead vessel 222, with the seismic source 220 coupled to the lead vessel by a source cable 226 that extends from the lead vessel 222 to the seismic source 220. The lead vessels 222 and seismic sources may be as discussed above in form and function, and thus complete descriptions of the lead vessels 222 and seismic sources will not be repeated again here so as not to unduly lengthen the specification. The remaining sensor streamers 206 that do not have an associated lead vessel 222 and seismic source may be associated with a lead buoy 904.

In the example system shown, the number of lead vessels 222 (and thus the number seismic sources 220) is less than the total number of sensor streamers 206. The example system of FIG. 9 shows twenty sensor streamers 206 and six lead-vessels 222 and respective seismic sources 220, but greater or fewer lead-vessels and seismic sources, and likewise greater or fewer sensor streamers 206, may be equivalently used (e.g., a lead vessel and source associated with every-other sensor streamer). Moreover, FIG. 9 shows a seismic source 220 associated with each of the outer sensor streamers 206; however, the seismic sources 220 may be associated with sensor streamers closer to the center of the streamer spread 902, and yet still address the issues associated with the large source-receiver offsets experienced by systems where the seismic sources are situated between the inner-most sensor streamers.

Figure 10:
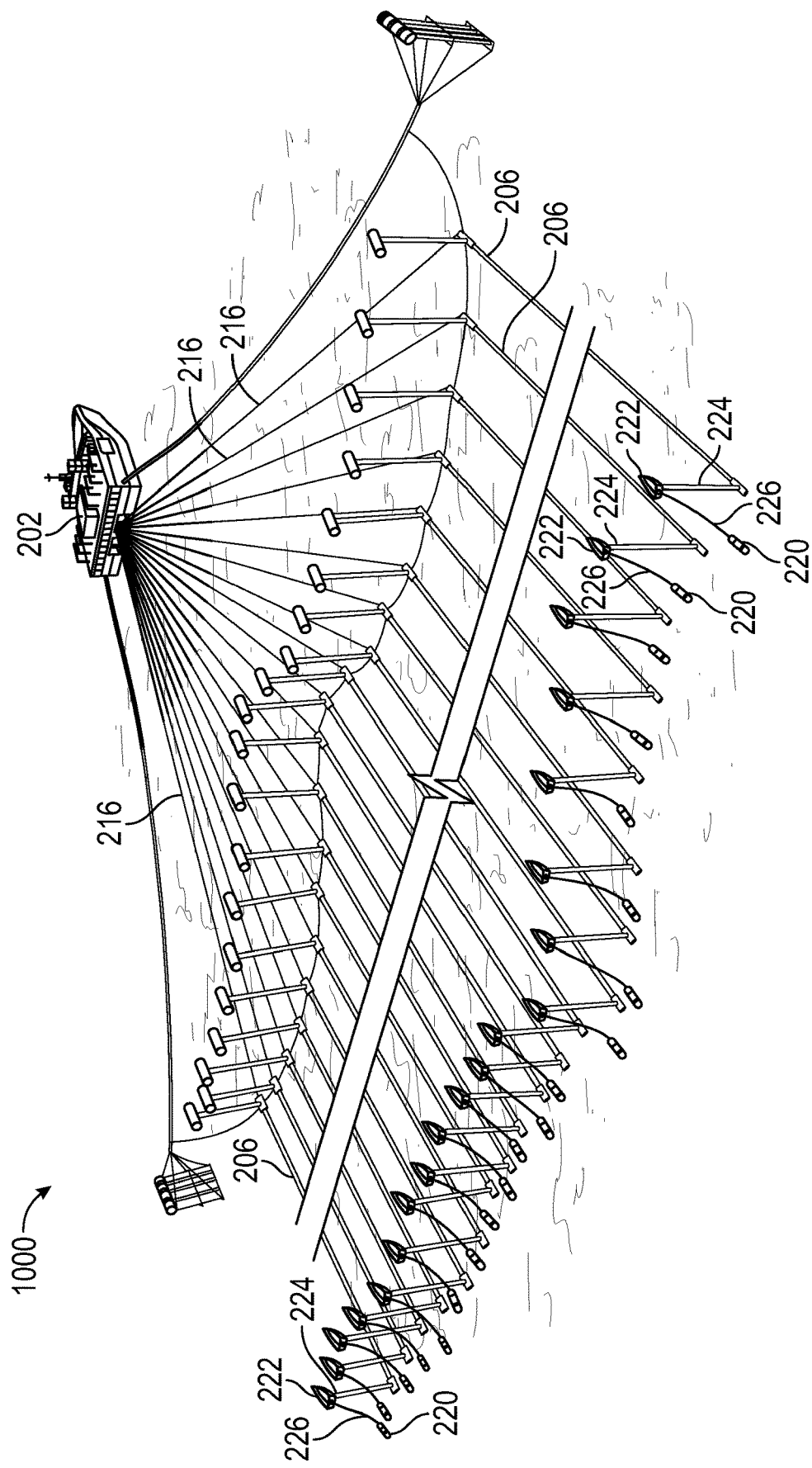
FIG. 10 shows a perspective view of a geophysical survey system in accordance with at least some embodiments.

FIG. 10 shows a geophysical survey system 1000 in accordance with yet still further embodiments. In particular, FIG. 10 shows the sensor streamers 206 towed behind the tow vessel 202 in the manner described above. FIG. 10 also shows lead vessels 222 and seismic sources 220 associated with the sensor streamers; however, rather than being coupled at the proximal end of the sensor streamers, the example lead-vessels 222 and seismic sources 220 are coupled at the distal ends of their associated sensor streamers 206. More particularly, each lead vessel 222 in the system of FIG. 10 has a tow cable 224 that couples between the lead vessel 222 and the distal end of the associated sensor streamer 206. Nevertheless, the towing force for the system shown in FIG. 10 is provided in whole or in large part from the tow vessel 202. That is, towing force for the seismic sources 220 is provided to the lead-in cables 216, along the sensor streamers 206, along the tow cables 224 to the lead vessels 222, and then along the source cables 226 to the seismic sources 220.

The operational aspects of activating the various sources 220 of FIG. 10 are the same as discussed above with respect to FIGS. 6-8, and will not be repeated again here so as not to unduly lengthen the specification. Moreover, while FIG. 10 shows a lead vessel 222 and seismic source 220 associated with every sensor streamer 206 in the example systems, having lead-vessels 222 and seismic sources 220 associated with less than all the sensor streamers 206 (similar to FIG. 9 except the association at the distal end rather than the proximal end of each sensor streamer) is also contemplated.

Figure 11:
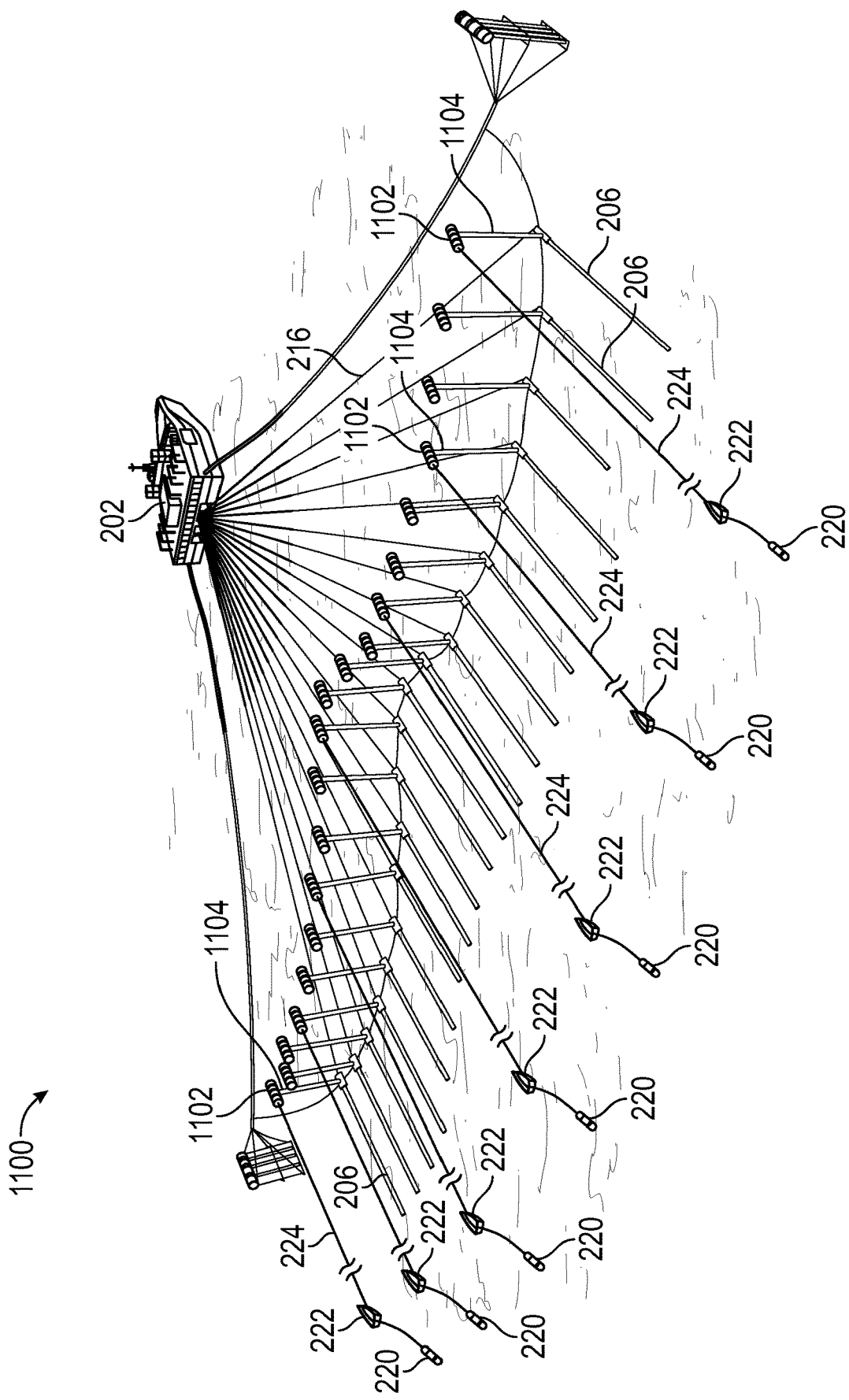
FIG. 11 shows a perspective view of a geophysical survey system in accordance with at least some embodiments.

FIG. 11 shows a geophysical survey system 1100 in accordance with yet still further embodiments. In particular, FIG. 11 shows the sensor streamers 206 towed behind the tow vessel 202 in the manner described above. FIG. 11 also shows lead vessels 222 and seismic sources 220 associated with sensor streamers in the manner similar to FIG. 9, where the number of seismic sources 220 and lead vessels 222 is less than the number of sensor streamers 206. The lead vessels 222 are coupled to the proximal end of the sensor streamers; however, tow cables 224 of FIG. 11 are significantly longer than the tow cables previously discussed, and the coupling to the proximal ends of the sensor streamers also includes a lead buoy 1102 and intermediate tow cable 1104. In particular, in accordance with example embodiments of FIG. 11, the intermediate tow cables 1104 may have a length about the same as the planned tow depth for the sensor streamers 206, and the tow cables 224 may have a length on the order of half overall length the sensor streamers 206 such that the seismic sources 220 reside at about the middle of the respective sensor streamer 206 over which each seismic source 220 is positioned. Thus, each tow cable 224 may be at least 25% of the length of an associated sensor streamer 206, and in some cases each tow cable will be about 50% of the length of an associated sensor streamer 206. By contrast, in the example systems of FIGS. 2 and 9 the seismic sources 220 may reside proximal to the first sensor of each sensor streamer (e.g., over the stretch sections and/or one or more sections with no active sensors). More particularly, each lead vessel 222 in the system of FIG. 11 has a tow cable 224 that couples between the lead vessel 222 and the lead buoy 1102, and the lead buoy 1102 has an intermediate tow cable 1104 that couples between the lead buoy 1102 and the proximal end of the sensor streamer 206. As before, the towing force for the system shown in FIG. 11 is provided in whole or in large part from the tow vessel 202. That is, towing force for the seismic sources 220 is provided to the lead-in cables 216, along the intermediate tow cable 1104, along the tow cables 224 to the lead vessels 222, and then along the source cables 226 to the seismic sources 220. With longer tow cables 224, the lead vessels 222 are more likely to implement active steering.

Figure 12:
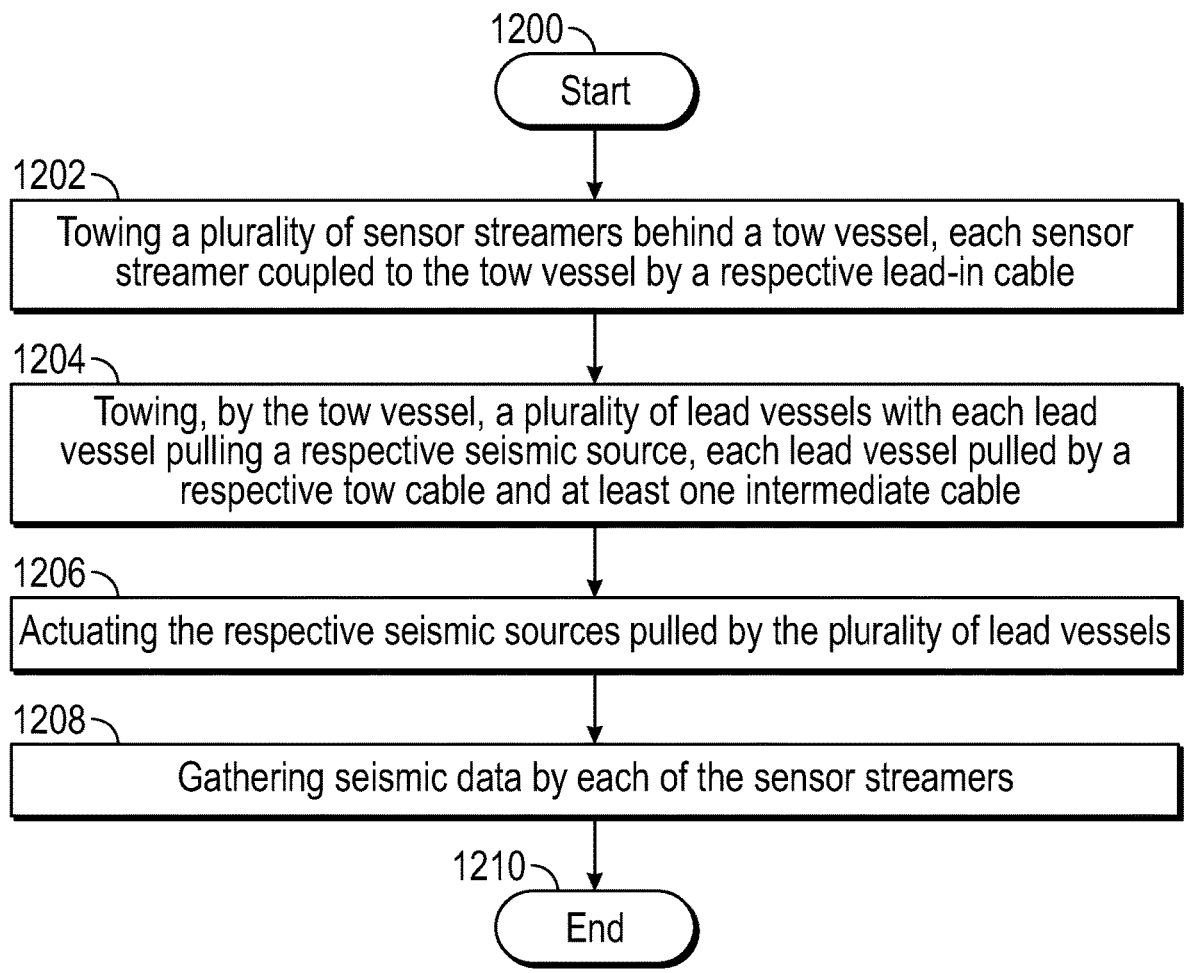
FIG. 12 shows a method in accordance with at least some embodiments.

The operational aspects of activating the various sources 220 of FIG. 11 are the same as discussed above with respect to FIGS. 6-8, and will not be repeated again here so as not to unduly lengthen the specification. Moreover, while FIG. 11 shows a lead vessel 222 and seismic source 220 associated with less than all the sensor streamer 206, having lead-vessels 222 and seismic sources 220 associated with all the sensor streamers 206 (similar to FIG. 2 except with longer tow cables 224) is also contemplated. Having the seismic sources 220 positioned near the mid-point of each sensor streamer enables "reverse push" surveying for those sensors of the sensor streamers more proximal than the sources FIG. 12 shows a method in accordance with at least some embodiments. In particular, the method starts (block 1200) and proceeds to towing a plurality of sensor streamers behind a tow vessel, each sensor streamer coupled to the tow vessel by a respective lead-in cable (block 1202). The method further comprises towing, by the tow vessel, a plurality of lead vessels with each lead vessel pulling a respective seismic source, each lead vessel pulled by a respective tow cable and at least one intermediate cable (block 1204). As discussed above, in some cases the intermediate cable is the lead-in cable for the associated sensor streamer. In other cases, the intermediate cable may be not only the lead-in cable, but also the sensor streamer itself when the lead-vessel and associated seismic source are disposed at the distal end of the associated sensor streamers. The method may further comprise actuating the respective seismic sources pulled by the plurality of lead vessels (block 1206), and gathering seismic data by each of the sensor streamers (block 1208). Thereafter, the method ends (block 1210), in most cases to continue as the tow vessel tows the streamer spread along a sail line.

In accordance with a number of embodiments of the present disclosure, a geophysical data product may be produced. The geophysical data product may include, for example, data collected in situations where the seismic sources are spread out across the proximal or distal end of the sensor streamers as discussed in this specification. Geophysical data, such as data previously collected by sensors, may be obtained (e.g., retrieved from a data library) and may be stored on a non-transitory, tangible computer-readable medium. The geophysical data product may also be produced by processing the gathered geophysical data offshore (i.e., by equipment on a vessel) or onshore (i.e., at a facility on land).

The above discussion is meant to be illustrative of the principles and various embodiments of the present invention. Numerous variations and modifications will become apparent to those skilled in the art once the above disclosure is fully appreciated. For example, the marine vibrators discussed herein may be electrical marine vibrators, electro-mechanical marine vibrators, electro-hydraulic marine vibrators, and/or any other vibrator source emitting transient acoustic energy. It is intended that the following claims be interpreted to embrace all such variations and modifications.

What is claimed is:

1. A method of performing a marine geophysical survey comprising:

towing a plurality of sensor streamers behind a tow vessel, each sensor streamer coupled to the tow vessel by a respective lead-in cable;

towing, by the tow vessel, a plurality of lead vessels with each lead vessel pulling a respective seismic source, each lead vessel pulled by a respective tow cable and a respective lead-in cable that is also pulling a sensor streamer;

actuating the respective seismic sources pulled by the plurality of lead vessels; and gathering seismic data by each of the sensor streamers.

2. The method of claim 1 wherein towing the plurality of lead vessels further comprises towing the plurality of lead vessels with each lead vessel pulled by a respective sensor streamer.

3. The method of claim 1 wherein actuating the respective seismic sources further comprises simultaneously actuating.

4. The method of claim 1 wherein actuating the respective seismic sources further comprises sequentially actuating in at least one selected from the group consisting of: sparse actuation; and dense actuation.

5. The method of claim 1 wherein actuating the respective seismic sources further comprises actuating in a quasi-random pattern.

6. The method of claim 1 wherein actuating the respective seismic sources further comprises actuating in a random pattern.

7. The method of claim 1 wherein towing the plurality of lead vessels further comprises towing a number of lead vessels such that each sensor streamer has an associated lead vessel.

8. The method of claim 1 wherein towing the plurality of lead vessels further comprises towing a number of lead vessels such that every-other sensor streamer has an associated lead vessel.

9. A method of performing a marine geophysical survey comprising:

towing a plurality of sensor streamers behind a tow vessel, each sensor streamer coupled to the tow vessel by a respective lead-in cable;

towing, by the tow vessel, a plurality of lead vessels with each lead vessel pulling a respective seismic source, each lead vessel pulled by a respective tow cable and at least one intermediate cable;

actuating the respective seismic sources pulled by the plurality of lead vessels;

gathering seismic data by each of the sensor streamers;

operating a respective air compressor in each of the plurality of lead vessels, each air compressor creating compressed air; and providing compressed air to the respective seismic source pulled by the respective plurality of lead vessels; and creating seismic energy by each seismic source being one or more air guns.

10. A method of performing a marine geophysical survey comprising:

towing a plurality of sensor streamers behind a tow vessel, each sensor streamer coupled to the tow vessel by a respective lead-in cable;

towing, by the tow vessel, a plurality of lead vessels with each lead vessel pulling a respective seismic source, each lead vessel pulled by a respective tow cable and at least one intermediate cable;

actuating the respective seismic sources pulled by the plurality of lead vessels;

gathering seismic data by each of the sensor streamers;

operating a respective electrical generator in each of the plurality of lead vessels, each electrical generator creating electrical voltage and current;

providing electrical voltage and current to the respective seismic source pulled by the respective plurality of lead vessels; and creating seismic energy by each seismic source being a marine vibrator.

11. A method of manufacturing a geophysical data product, the method comprising:

obtaining geophysical data by a sensor streamer spread where a first seismic source is pulled behind a first lead vessel, the first lead vessel is pulled by a tow cable coupled to a proximal end of a first sensor streamer, and both the first lead vessel and the first sensor streamer are pulled by a first lead-in cable coupled between the proximal end of the first sensor streamer and a tow vessel; and recording the geophysical data on a tangible computer-readable medium.

12. The method of claim 11 wherein the geophysical data is obtained by the sensor streamer spread further comprising a second seismic source pulled behind a second lead vessel coupled to a proximal end of a second sensor streamer of the sensor streamer spread, the second lead vessel coupled to the second sensor streamer by a tow cable that extends between the proximal end of the second sensor streamer and the second lead vessel.

13. The method of claim 12 wherein the first sensor streamer and first lead vessel are a first outermost position of the sensor streamer spread, and the second sensor streamer and second lead vessel are a second outermost position of the sensor streamer spread, the second outermost position opposite the first outermost position.

14. The method of claim 12 wherein obtaining the geophysical data product further comprises actuating the seismic sources in a pattern being at least one selected from the group consisting of: simultaneously actuating; sequentially actuating; actuating in a quasi-random pattern; and actuating in a random pattern.

15. The method of claim 12 wherein obtaining the geophysical data product further comprises actuating the seismic sources in random pattern.

* * * * *